(12) United States Patent
Kondo

(10) Patent No.: US 6,793,413 B1
(45) Date of Patent: Sep. 21, 2004

(54) NOSE PAD FOR CAMERA

(76) Inventor: Takashi Kondo, 104-2 Tsubakikouge, Tsuyama-shi, Okayama-ken (JP)

(*) Notice: Subject to any disclaimer, the term of this patent is extended or adjusted under 35 U.S.C. 154(b) by 0 days.

(21) Appl. No.: 10/732,534

(22) Filed: Dec. 11, 2003

Related U.S. Application Data

(63) Continuation-in-part of application No. 29/185,807, filed on Jul. 7, 2003, and a continuation-in-part of application No. 29/185,808, filed on Jul. 7, 2003.

(51) Int. Cl.⁷ .............................................. G03B 17/02
(52) U.S. Cl. ........................ 396/421; 396/544; 396/661
(58) Field of Search ................................ 396/421, 535, 396/540, 544, 661

(56) References Cited

U.S. PATENT DOCUMENTS 6,217,235 B1 * 4/2001 Kondo ...................... 396/421

* cited by examiner

Primary Examiner—David M. Gray
(74) Attorney, Agent, or Firm—Manabu Kanesaka

(57) ABSTRACT

A nose pad for a camera includes a flat sheet portion and at least one projecting portion projecting from a front surface of the flat sheet portion. The projecting portion has an inclined surface at one side thereof so that when the nose pad is attached to the camera, a nose of a user can be put on the inclined surface to immovably hold the camera supported with hands. When a shutter switch is pushed, the camera can be held properly without moving the camera.

6 Claims, 4 Drawing Sheets

NOSE PAD FOR CAMERA

CROSS REFERENCE TO RELATED APPLICATION

This is a continuation-in-part application of patent applications Ser. No. 29/185,807 filed on Jul. 7, 2003, and Ser. No. 29/185,808 filed on Jul. 7, 2003.

BACKGROUND OF THE INVENTION AND RELATED ART STATEMENT

The present invention relates to a nose pad to be attached to a camera for stabilizing the camera when a person holds the camera.

In shooting a picture, it is essential to hold a camera steadily so that the picture is taken without blur. In many cases, it is also important to hold a camera horizontally so that a desired view in a desired angle is obtained.

It is relatively easy to perform these essential operations when a camera is a compact type and lightweight. Even though a large heavy camera such as a single-lens reflex camera is used, it is easy to accomplish when a tripod is used or it is possible to take a long time to shoot a picture. For example, it is relatively easy to obtain a high quality picture in a photo studio where a high performance camera, even though large and heavy, is mounted on a tripod, and a person can take long time to make sure that a proper view in a proper angle is captured before shooting a picture.

However, it is extremely difficult to take a high quality picture in a situation where conditions are not perfect. For example, it is difficult to hold a large heavy camera steadily and horizontally with hands within a short period of time. There is a case that a time for shooting a good picture is almost instantaneous. A person may need to hold a camera and shoot a picture within a second, otherwise the right moment for a good picture is lost.

It takes long time for a person to have an experience and training to be able to hold a large camera steadily and horizontally in the right way within a short period of time.

In view of the issues described above, the present invention has been made, and an object of the present invention is to provide a nose bad to be attached to a camera for stabilizing the camera when a person holds the camera.

Further objects and advantages of the invention will be apparent from the following description of the invention.

SUMMARY OF INVENTION

In order to achieve the objects described above, according to an embodiment of the present invention, a nose pad includes a flat sheet portion and at least one projecting portion projecting from a front surface of the flat sheet portion. The projecting portion has an inclined surface at one side thereof so that when the nose pad is attached to a camera, a nose of a user can be put on the inclined surface to immovably hold the camera supported with hands. The projecting portion may be formed on at least one lateral side of the flat sheet, and has an arc shape expanding toward a center of the flat sheet portion at a center area thereof and extending vertically so that the center area has a height from the front surface of the flat sheet portion higher than those of other portions of the projecting portion.

Accordingly, the user can easily and comfortably put or touch the nose to the nose pad attached to the camera. Thus, the camera can be held and supported with the nose. When a shutter is pushed, the camera does not substantially move or shake by the nose.

In the present invention, the projecting portion may further include a curved top line extending vertically in a middle of the projecting portion, and an outer inclined surface located at an outer side of the curved top line. In this case, the inclined surface is located at a side opposite to the outer inclined surface. Even though the projecting portion is attached to the camera, the projecting portion does not hinder the handling of the camera.

In the present invention, the flat sheet portion may further include a recess portion at the back surface thereof corresponding to the projecting portion on the front surface of the flat sheet. In the nose pad of the invention, the projecting portion has a thickness larger than that of the flat sheet portion. Accordingly, the projecting portion has elasticity larger than that of the flat sheet portion, resulting in that the nose pad may peel off from the camera from a portion around the location on the back surface of the flat sheet portion corresponding to the projecting portion. With the recess portion, it is possible to prevent the nose pad from easily coming off the camera from the portion around the location on the back surface of the flat sheet portion corresponding to the projecting portion.

In the present invention, an adhesive sheet may be attached to the back surface of the flat sheet portion. Accordingly, it is easy to attach the nose pad to an appropriate portion of the camera with the adhesive sheet. The flat sheet portion may further include a cut out portion at a side away from the projection for accommodating a protruding part of the camera.

DETAILED DESCRIPTION OF PREFERRED EMBODIMENTS

Figure 1:
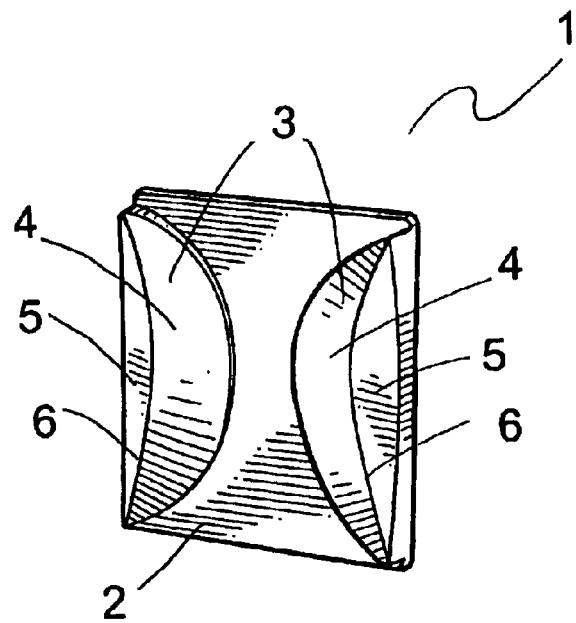
FIG. 1 is a perspective view of a nose pad for a camera according to an embodiment of the present invention.
Figure 2:
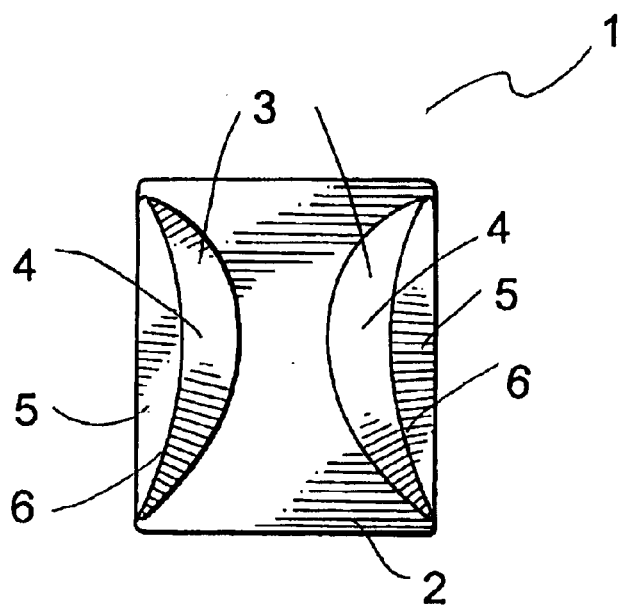
FIG. 2 is a front view of the nose pad shown in FIG. 1.

Hereinafter, preferred embodiments of the invention will be explained with reference to the accompanying drawings. FIG. 1 is a perspective view of a nose pad for a camera according to an embodiment of the present invention. FIG. 2 is a front view of the nose pad shown in FIG. 1.

As shown in FIGS. 1 and 2, a nose pad 1 includes a flat sheet portion 2 and two projecting portions 3. The projecting portions 3 are formed on two lateral sides of the flat sheet portion 2, and protrude from a front surface of the flat sheet portion 2. Each of the projecting portions 3 has an inclined surface 4 at one side thereof. Accordingly, when the nose pad is attached to a camera, a nose of a user can be put on the inclined surface to immovably hold the camera supported with hands.

Each projecting portion 3 has an arc shape expanding toward a center of the flat sheet portion 2 at a center area thereof and extending vertically. Also, each projecting portion 3 has the center area having a height from the front surface of the flat sheet portion higher than those of other portions of the projecting portion 3.

In particular, each projecting portion 3 has a curved top line 6 extending vertically in a middle of the projecting portion 3. Thus, each projecting portion 3 has an outer inclined surface 5 located at an outer side of the curved top line 6. The inclined surface 4 is located at a side opposite to the outer inclined surface 5.

As shown in FIGS. 1 and 2, the projecting portions 3 have substantially symmetrical curved shapes relative to the vertical centerline of the flat sheet portion 2. The nose of the user can be held between the projecting portions 3.

According to the embodiment of present invention, the nose pad 1 may be formed of an elastic material such as an elastomer. A conventional method such as injection molding is used for molding the nose pad 1.

Figure 3:
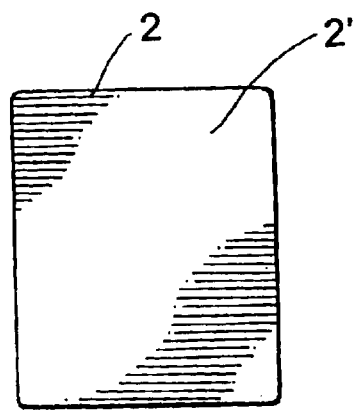
FIG. 3 is a backside view of the nose pad shown in FIG. 1.

FIG. 3 is a backside view of the nose pad 1 of the embodiment shown in FIGS. 1 and 2. In this embodiment, the flat sheet portion 2 of the nose pad 1 has a flat back surface, and an adhesive 2' is provided on the back surface of the flat sheet portion. The adhesive 2' may be self-adhesive type and covered with a protective sheet. Before the nose pad 1 is attached to the camera, the protective sheet is peeled off from the adhesive sheet. Accordingly, it is easy to attach the nose pad to an appropriate portion of the camera through the adhesive sheet.

Figure 4:
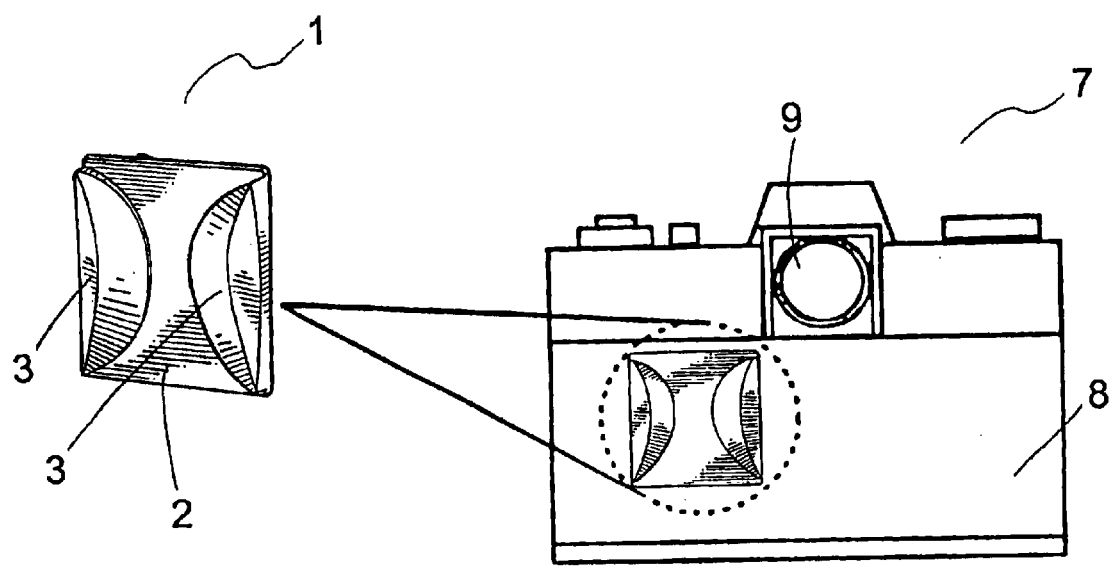
FIG. 4 is a backside view of a camera to which the nose pad shown in FIG. 1 is attached.

FIG. 4 is a backside view of a camera 7 to which the nose pad 1 is attached. The camera 7 has a finder window 9 at a center top of a backside 8 thereof. As shown in FIG. 4, the nose pad 1 is attached to the backside 8 of the camera 7 at a location below the finder window 9 and slightly left of the vertical center of the camera 7. FIG. 4 shows an example of the application of the nose pad 1 for a right-handed person, who naturally looks into the finer window with the right eye. In this case, a nose of the right-handed person is put on the inclined surfaces 4 of the nose pad 1 when the person holds the camera 7 with both hands.

When the nose pad 1 is used for a left-handed person, the nose pad 1 is attached to the backside 8 of the camera 7 at a location below the finder window 9 and slightly right of the vertical center of the camera 7.

In use, when the camera 7 is held by hands, the nose is located between the projecting portions 3 and is slightly pushed to the nose pad 1. Thus, the camera 7 is held by both hands and the nose. Therefore, when a shutter switch is pushed, even if the camera is likely to move slightly, the camera can be surely supported.

Figure 5:
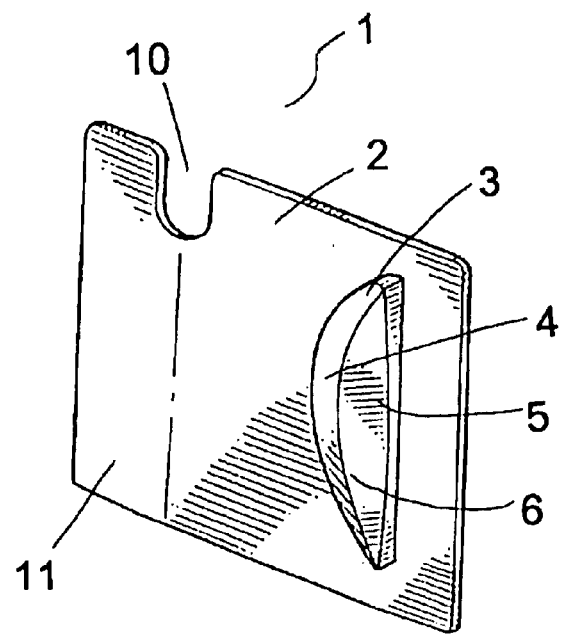
FIG. 5 is a perspective view of a nose pad for a camera according to another embodiment of the present invention.
Figure 6:
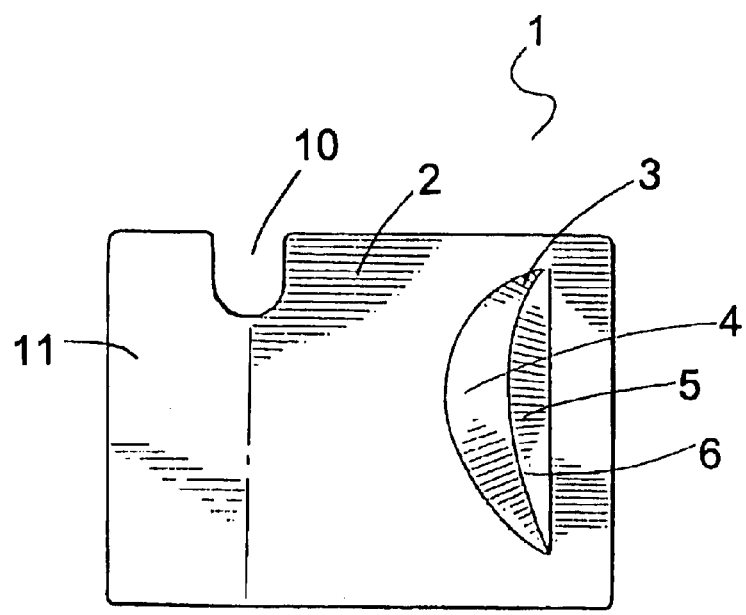
FIG. 6 is a front view of the nose pad shown in FIG. 5.

FIG. 5 is a perspective view of a nose pad for a camera according to another embodiment of the present invention. FIG. 6 is a front view of the nose pad shown in FIG. 5. As shown in FIGS. 5 and 6, the nose pad 1 includes the flat sheet portion 2 and the projecting portion. 3. In this embodiment, only one projecting portion 3 is provided on the right lateral side of the flat sheet portion 2. The projecting portion 3 projects from the front surface of the flat sheet portion 2. The projecting portion 3 has the inclined surface 4 at a left side thereof.

As shown in FIGS. 5 and 6, similar to that of the embodiment shown in FIG. 1, the projecting portion 3 has a curved shape expanding toward a center of the flat sheet portion 2 at a center area thereof and extending vertically. The center area of the projecting portion 3 has a height from the front surface of the flat sheet portion 2 higher than those of other portions of the projecting portion 3. The projecting portion 3 has the curved top line 6 extending vertically in a middle of the projecting portion 3. The projecting portion 3 also has the outer inclined surface 5 located at an outer side of the curved top line. Accordingly, the inclined surface 4 is located at a side opposite to the outer inclined surface 5.

In this embodiment, as shown in FIGS. 5 and 6, the flat sheet portion 2 has a cut out portion 10 at an upper left side away from the projecting portion 3. When the nose pad 1 is attached to a camera having a projection such as a strap hole projection at a side thereof, the projection can be accommodated in the cut out portion 10.

In this embodiment, as shown in FIGS. 5 and 6, the flat sheet portion 2 has an inclined surface portion 11 at the left lateral side thereof. The inclined surface portion 11 has a thickness decreasing toward the left side edge of the flat sheet portion 2. With the inclined surface portion 11 of the flat sheet portion 2, when the nose pad 1 is attached to a camera, the left edge of the flat sheet portion easily and closely contacts the camera, and the nose pad 1 is difficult to come off the camera. An inclined surface portion similar to the inclined surface portion 11 may be provided on the right side portion or around the entire periphery of the flat sheet portion 2.

Figure 7:
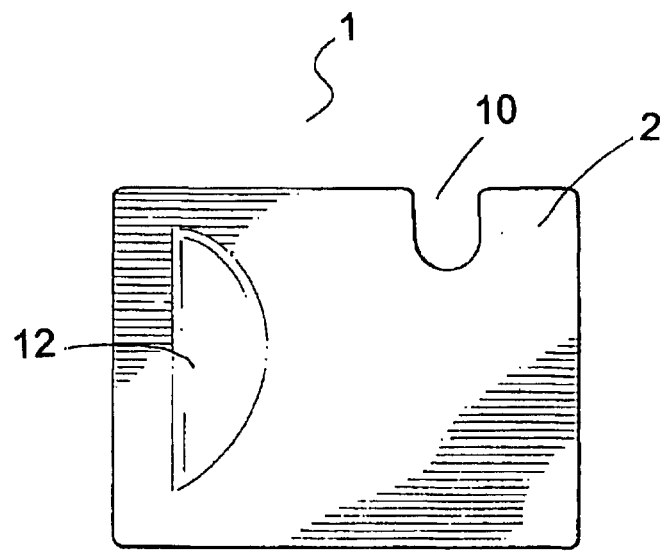
FIG. 7 is a backside view of the nose pad shown in FIG. 5.

FIG. 7 is a backside view of the nose pad 1. In this embodiment, a recess portion 12 is formed in the back surface of the flat sheet 2 at a location corresponding to the projecting portion 3 on the front surface of the flat sheet 2. In the nose pad 1 of the embodiment, the projecting portion 3 has a thickness larger than that of the flat sheet portion 2. Accordingly, the projecting portion 3 has elasticity larger than that of the flat sheet portion 2, resulting in that the nose pad 1 is likely to peel off from the camera from a portion around the location on the back surface of the flat sheet portion 2 corresponding to the projecting portion 3. With the recess portion 12, it is possible to prevent the nose pad 1 from easily coming off the camera from the portion around the location on the back surface of the flat sheet portion 2 corresponding to the projecting portion 3.

Figure 8:
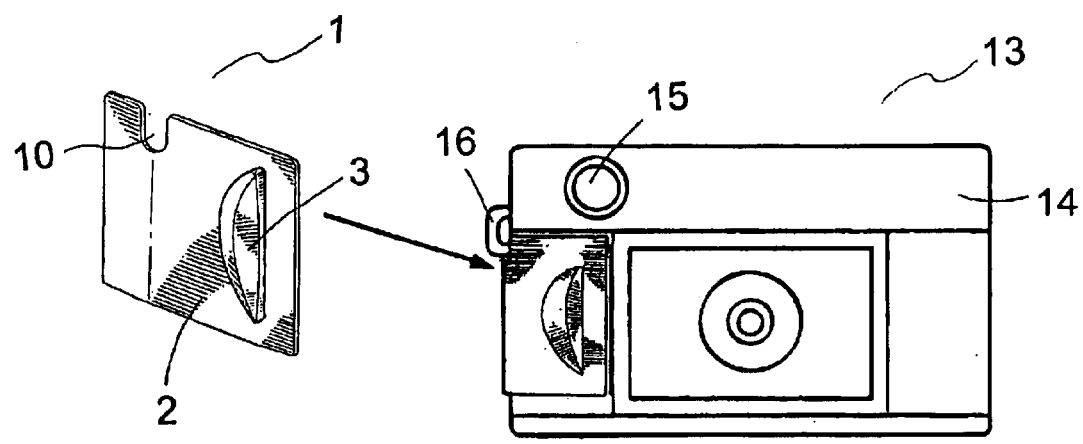
FIG. 8 is a backside view of a camera to which the nose pad shown in FIG. 5 is attached.

FIG. 8 is a backside view of a camera to which the nose pad 1 of the embodiment is attached. A camera 13 has a finder window 15 at an upper left of a backside 14 thereof. The camera 13 further includes a strap hole projection 16 at a left side thereof. A strap (not shown) can pass through the strap hole projection 16. As shown in FIG. 8, the nose pad 1 is attached to the backside 14 of the camera 12 at a location below the finder window 15 by the adhesive, as in the first embodiment. In this case, when a person holds the camera 13 with both hands, a right side of a nose of the person contacts a left side, i.e. the inclined surface, of the projecting portion 3 of the nose pad 1. Therefore, the person can hold the camera steadily and horizontally within a very short period of time.

As described above, according to the present invention, the nose pad has at least one projecting portion. The projecting portion has the inclined surface and is formed in the curved shape, so that when a person holds the camera, a nose of the person can be put on the inclined surface of the projecting portion with a minimum gap therebetween. Accordingly, it is possible to hold the camera steadily and horizontally in a very short period of time. Even a person with minimum experience can easily hold the camera in the right way and pushes a shutter switch without moving the camera. Therefore, it is easy to obtain a high quality picture.

While the invention has been explained with reference to the specific embodiments of the invention, the explanation is illustrative and the invention is limited only by the appended claims.

What is claimed is:

1. A nose pad to be attached to a camera, comprising:
   a flat sheet portion having a front surface and a back surface, and
   at least one projecting portion formed on at least one lateral side of the flat sheet portion to project from the front surface of the flat sheet portion, and having an inclined surface at one side thereof so that when the nose pad is attached to the camera, a nose of a user can be put on the inclined surface to immovably hold the camera supported with hands, and an arc shape expanding toward a center of the flat sheet portion at a center area thereof and extending vertically so that the center area has a height from the front surface of the flat sheet portion higher than those of other portions of the projecting portion.

2. A nose pad according to claim 1, wherein said at least one projecting portion further includes a curved top line extending vertically in a middle of the projecting portion, and an outer inclined surface located at an outer side of the curved top line, said inclined surface being located at a side opposite to the outer inclined surface.

3. A nose pad according to claim 2, wherein two projecting portions are formed on the flat sheet portion with a space therebetween.

4. A nose pad according to claim 1, wherein said flat sheet portion further includes a recess portion at the back surface thereof corresponding to the at least one projecting portion on the front surface of the flat sheet.

5. A nose pad according to claim 4, wherein said flat sheet portion includes the back surface provided with an adhesive sheet.

6. A nose pad according to claim 1, wherein said flat sheet portion further includes a cut out portion at a side away from the at least one projection for accommodating a protruding part of the camera.

* * * * *